No. 618,131. Patented Jan. 24, 1899.
H. L. PARKER & C. R. MESTON.
BEARING FOR ARMATURE SHAFTS OF ELECTRIC MOTORS.
(Application filed July 9, 1898.)
(No Model.)
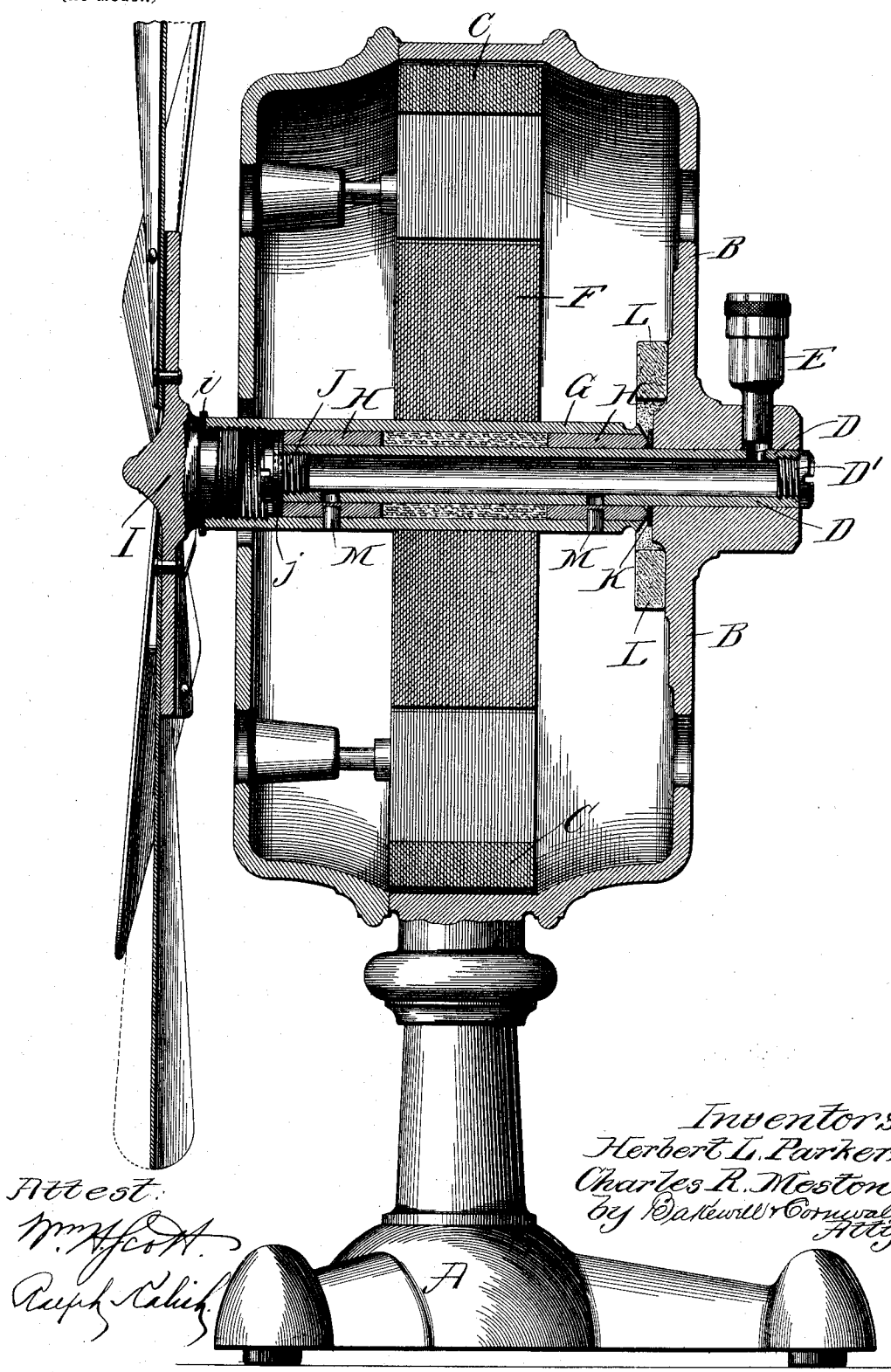

UNITED STATES PATENT OFFICE.

HERBERT L. PARKER AND CHARLES R. MESTON, OF ST. LOUIS, MISSOURI, ASSIGNORS TO THE EMERSON ELECTRIC MANUFACTURING COMPANY, OF SAME PLACE.

BEARING FOR ARMATURE-SHAFTS OF ELECTRIC MOTORS.

SPECIFICATION forming part of Letters Patent No. 618,131, dated January 24, 1899.

Application filed July 9, 1898. Serial No. 685,493. (No model.)

*To all whom it may concern:*

Be it known that we, HERBERT L. PARKER and CHARLES R. MESTON, citizens of the United States, residing at St. Louis, State of Missouri, have made a certain new and useful Improvement in Bearings for Armature-Shafts of Electric Motors, of which the following is a full, clear, and exact description, such as will enable others skilled in the art to which it appertains to make and use the same, reference being had to the accompanying drawing, forming part of this specification, in which—

The figure represents a vertical sectional view of our improved bearing for the armature-shaft of an electric motor.

This invention relates to a new and useful improvement in bearings for the armature-shaft of an electric motor, the object being to provide a fixed shaft on which is mounted the armature through the medium of a hollow sleeve, which sleeve carries a lubricant supplying oil to the moving parts, to the end that little or no attention is required by way of lubrication.

With this object in view the invention consists in mounting a fixed shaft in the framing of the motor and in mounting on said fixed shaft a hollow sleeve carrying bearing-points or bushings to engage said shaft, said hollow shaft having the armature mounted thereon and carrying at its outer end fan-blades or a pulley.

Other features of invention reside in the construction, arrangement, and combination of the several parts, all as will hereinafter be described, and afterward pointed out in the claims.

In the drawing, A indicates a suitable base which supports the framing B, said framing forming a support for the field-magent core C. This framing B is preferably formed with an elongated hub portion, in which is fixed a shaft D, said shaft being preferably driven in place. Shaft D is made hollow, as shown, into which may be fed a lubricant from oil-cup E for purposes of local lubrication when necessary.

F indicates the armature, which is forced upon a sleeve G, said sleeve containing bushings H at or near each end, which are bored to receive the fixed shaft D. The other end of sleeve G is internally threaded to receive a hub portion I on which fan-blades or a pulley may be secured. These parts are so threaded that the direction of rotation of the hollow sleeve G tends to tighten the fan or pulley-hub therein. A washer, of leather or other suitable material, is preferably interposed between the hub I, and the end of shaft G for the purposes of stopping any lubricant which might escape into the front end of sleeve G. The front end of fixed shaft D is likewise threaded to receive a screw-plug J, between which and the end of said fixed shaft is interposed a leather or other suitable washer *j*, which washer extends laterally to bear against the outer bushing H of sleeve G, and thereby hold said sleeve G in position.

K indicates a washer interposed between the inner end of sleeve G and inner bushing H and the casing B, forming a tight joint to prevent the escape of lubricant at this point.

In order to reduce the friction of the moving parts against washer K, we prefer to form a continuous knife-edge on the bushing H to engage the washer.

L indicates a ring, of felt or other absorbing material, which surrounds the washer K for the purpose of collecting any escaping lubricant from the inner end of the shaft.

M indicates pins which are preferably driven through the sleeve G and into the bushings H to hold said bushings firmly in place and prevent rotary and longitudinal movement thereof.

The end of fixed shaft D is closed by a suitable plug D′ for obvious reasons. The casing B is usually made of cast-iron, while the fixed shaft D is of case-hardened steel and driven into the elongated hub of casing B. The laminations composing the armature are driven upon sleeve G, we having found by experiment that the rough edges of the laminations form a sufficient binding without any other form of attachment. When the armature is in position on sleeve G, the bushings H are introduced and properly positioned, after which the openings are bored through said bushings for the reception of the fixed shaft. The armature is now placed in a balancing-machine and properly balanced, after which the front end of sleeve G is threaded and the knife-edge formed on the rear end of said sleeve.

The lubricant used between the bushings is preferably vaseline and is forced in place through a hollow perforated tube, as is well understood, after which the sleeve is slipped onto the fixed shaft. The vaseline acts as a lubricant between the bushings H and the fixed shaft, and in the event of heat in the bearings the vaseline will become more liquefied and flow freer.

Should it be desired for any reason to additionally lubricate the parts, oil may be introduced through the cup E, which passes through the hollow fixed shaft and through suitable openings onto the bushings H.

We are aware that minor changes in the arrangement, construction, and combination of the several parts of our bearing can be made and substituted for those herein shown and described without in the least departing from the nature and principle of our invention.

Having thus described our invention, what we claim, and desire to secure by Letters Patent, is—

1. The combination with a suitable frame for supporting an annular laminated field-magnet core, of a shaft fixed in said frame, a sleeve mounted on said shaft, and a laminated armature-core mounted on said sleeve, substantially as described.

2. The combination with a suitable frame for supporting the field-magnet core, of a shaft fixed in said frame, a sleeve mounted on said shaft, bushings interposed between said sleeve and shaft, and an armature arranged on said sleeve, substantially as described.

3. The combination with a frame, of a shaft fixed therein, a sleeve mounted on said shaft, an armature carried by said sleeve, and a washer interposed between said sleeve and frame, said sleeve being formed with an annular reduced bearing portion to engage said washer, substantially as described.

4. The combination with a suitable frame, of a shaft fixed therein, a sleeve mounted on said shaft, bushings fixed in said sleeve, and interposed between said shaft and said sleeve, an armature mounted on said sleeve, and a plug introduced into the fixed shaft and extending laterally to engage one of said bushings, to hold the sleeve in position, substantially as described.

5. The combination with a fixed shaft, of a sleeve mounted thereon, an armature on said sleeve, a hub attached to the outer end of the sleeve, and a washer interposed between said sleeve and hub, to seal said other end of the sleeve, substantially as described.

6. The combination with a casing, of a hollow fixed shaft, an oil-cup leading into said shaft, plugs in each end of said shaft, a sleeve mounted on said shaft, a hub carried by the outer end of the sleeve, and an armature mounted on said sleeve, substantially as described.

7. The combination with suitable framing, of a fixed shaft mounted therein, a sleeve mounted on said shaft, an armature carried by said shaft, a washer interposed between said sleeve and framing, and a ring L surrounding said washer, said ring being composed of absorbing material, substantially as described.

8. The combination with the framing B carrying the magnet-core C, of a fixed hollow shaft D mounted therein, a plug D' in the rear end of said shaft, an oil-cup E leading into said hollow shaft, sleeve G, bushings H on said sleeve and engaging said fixed shaft, hub I secured into the front end of said sleeve, a plug J secured into the front end of the hollow shaft, and washers which are clamped in position by said plug against the front end of the hollow shaft, said washers, also, engaging one of the bushings H, substantially as described.

In testimony whereof we hereunto affix our signatures, in the presence of two witnesses, this 28th day of June, 1898.

HERBERT L. PARKER.
    CHARLES R. MESTON.

Witnesses:
 F. R. CORNWALL,
 HUGH K. WAGNER.